United States Patent [19]
Yoshizawa et al.

[11] 4,135,219
[45] Jan. 16, 1979

[54] DEMAGNETIZER FOR A MAGNETIC HEAD OF A RECORDING-REPRODUCING DEVICE

[75] Inventors: Keiichi Yoshizawa, Chiba; Isamu Nakao, Machida, both of Japan

[73] Assignee: TDK Electronics Co., Ltd., Tokyo, Japan

[21] Appl. No.: 817,181

[22] Filed: Jul. 20, 1977

[30] Foreign Application Priority Data

Jul. 22, 1976 [JP] Japan ................................ 51-86569
Jul. 22, 1976 [JP] Japan ................................ 51-86570

[51] Int. Cl.² .......................................... G11B 5/46
[52] U.S. Cl. ................................... 360/128; 361/149; 361/267; 360/137
[58] Field of Search .............. 360/128, 137, 130, 66, 360/132; 335/284; 361/267, 149–151; 307/101

[56] References Cited

U.S. PATENT DOCUMENTS

| | | | |
|---|---|---|---|
| 2,538,893 | 1/1951 | Begun | 361/151 |
| 2,962,560 | 11/1960 | Folse | 361/151 |
| 3,038,036 | 6/1962 | Young et al. | 360/66 |
| 3,093,774 | 6/1963 | Christianson et al. | 361/149 |
| 3,417,306 | 12/1968 | Knak | 320/1 |
| 3,435,300 | 3/1969 | Sato | 361/149 |
| 3,647,990 | 3/1972 | Eul, Jr. et al. | 360/128 |
| 3,655,924 | 4/1972 | Puskas | 360/128 |
| 3,721,885 | 3/1973 | McKeown et al. | 320/1 |

*Primary Examiner*—Alfred H. Eddleman
*Attorney, Agent, or Firm*—Cooper, Dunham, Clark, Griffin & Moran

[57] ABSTRACT

A demagnetizer for a magnetic head for a recording/reproducing device. The demagnetizer includes an electromagnet for producing an alternating magnetic field which gradually decreases in intensity. The demagnetizer is mounted in a case formed in the shape of a tape cassette. The electromagnet is resiliently held within the case adjacent to the opening for the magnetic head to be demagnetized. The electromagnet is energized by an oscillating drive circuit, the output of which is controlled by a capacitor.

3 Claims, 11 Drawing Figures

DEMAGNETIZER FOR A MAGNETIC HEAD OF A RECORDING-REPRODUCING DEVICE

BACKGROUND AND BRIEF DESCRIPTION OF THE INVENTION

The present invention relates to a demagnetizer for a magnetic head of a magnetic recording-reproducing device. It has particular application to tape recorders, magnetic card recorders, and magnetic disk recording-reproducing apparatus, especially cassette tape recorders.

During recording and reproducing, a magnetic head of a magnetic recording-reproducing device is gradually magnetized, and this magnetized head exerts a harmful influence upon the recording-reproducing characteristics. Accordingly, it is necessary to demagnetize the head periodically. A demagnetizer which produces a strong and definite alternating magnetic field is known, but it is necessary to move the demagnetizer manually so as to gradually decrease the magnetic field applied to the magnetic head. Such operation requires a great deal of skill.

A cleaning cassette having a permanent magnet in its case to demagnetize the head is disclosed in U.S. Pat. No. 3,647,990 issued Mar. 7, 1972, but it is difficult to demagnetize the head completely with such a device and it takes too much time to complete the demagnetizing operation. In any event, it is necessary to move the demagnetizer against the head in such prior devices.

It is an object of the present invention to provide a demagnetizer which can easily and completely demagnetize a magnetic head. Another object of the invention is to provide a demagnetizer which can demagnetize a magnetic head in a short time by use of a high frequency alternating magnetic field. Another object of the invention is to provide a compact demagnetizer which may be included in a tape cassette case and which does not require movement of the demagnetizer within the case away from the magnetic head to decrease the demagnetizing field.

These and other objects are attained in the present invention by a demagnetizer for a magnetic head comprising an electromagnet which is energized by a driving circuit so as to produce an alternating magnetic field which gradually decreases in intensity. A demagnetizer incorporated in a tape cassette case is preferably utilized for demagnetizing the magnetic head of a cassette tape recorder. The electromagnet is preferably energized by a driving circuit which includes an oscillator, the output of which is gradually decreased to produce the gradually decreasing alternating magnetic field. The oscillator may be controlled by a capacitor, the charge of which determines the output of the oscillator. When incorporated in a cassette case, the electromagnet is positioned adjacent to the opening therein for the magnetic head to be demagnetized. Th electromagnet is preferably resiliently held in place within the cassette case, and is coupled to a switch for controlling the energization of the electromagnet drive circuit.

The invention will be more completely understood by reference to the following detailed description.

BRIEF DESCRIPTION OF THE DRAWINGS

in FIG. 7 the upper case section has been shown.

DETAILED DESCRIPTION

Figure 1:
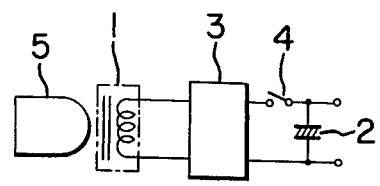
FIG. 1 is a block diagram of a basic form of a demagnetizer circuit useful in the present invention.

FIG. 1 shows a basic form of demagnetizer assembly useful in the present invention, wherein 1 is an electromagnet for demagnetizing a magnetic head 5 of a recording-reproducing device (not otherwise shown). A driving circuit 3 is used to energize the electromagnet advantageously incorporating an oscillator therein. A capacitor 2 is employed, having a large capacitance and charged by a source of D.C. potential (not shown). A switch 4 controls the application of current from the capacitor to the driving circuit.

Figure 2:
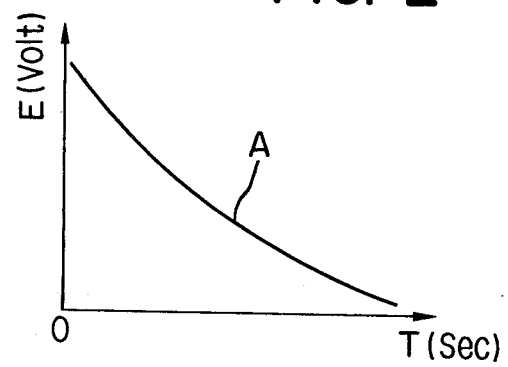
FIG. 2 is a graph showing the relation between voltage and time in part of the circuit of FIG. 1.
Figure 3:
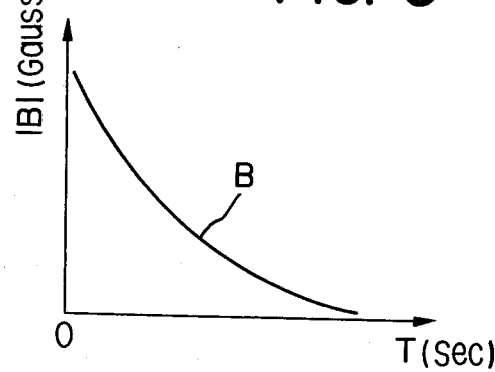
FIG. 3 is a graph showing the relation between magnetic field strength and time in the circuit of FIG. 1.

FIG. 2 shows the variation of the terminal voltage of capacitor 2 when the capacitor discharges current to the driving circuit. In FIG. 2, the terminal voltage of capacitor 2 exponentially decreases after the switch 4 is closed. In FIG. 1, the capacitor is charged by a D.C. source (not shown), the electromagnet 1 is placed adjacent to the magnetic head 5 to be demagnetized, and the switch 4 is closed. At the moment the switch is closed, the capacitor 2 begins to discharge and to supply the discharge current to the driving circuit. That circuit preferably includes an oscillator which oscillates and excites the electromagnet. As shown in FIG. 2, the output potential of capacitor 2 decreases exponentially, and the output of the oscillator also decreases in like fashion. Since the strength of the alternating magnetic field from the electromagnet is governed by the output of the driving circuit, the strength of that field decreases, thereby to demagnetize the magnetic head 5. The decrease in the absolute value of the magnetic field from the electromagnet 1 is shown in FIG. 3.

Figure 4:
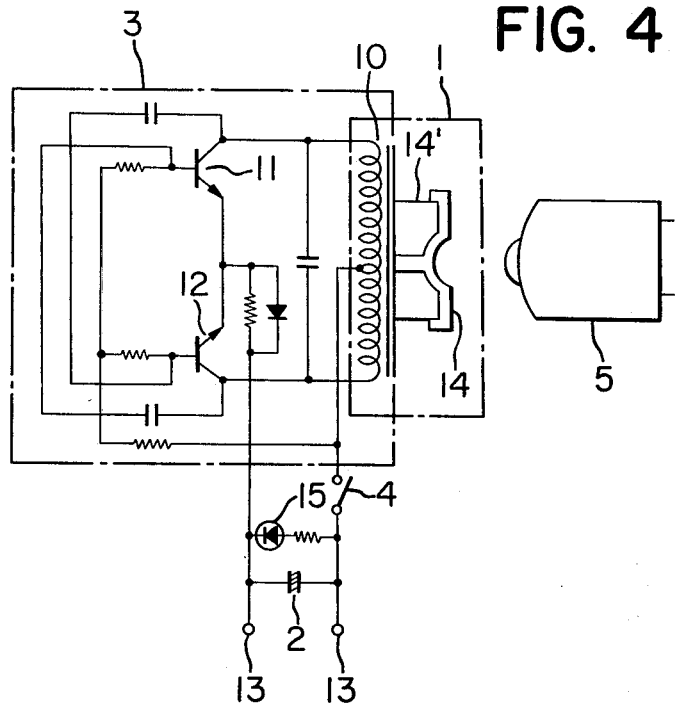
FIG. 4 is a detailed circuit diagram of a circuit in accordance with FIG. 1.

FIG. 4 shows a circuit useful in the present invention, wherein driving circuit 3 is of the capacitor coupled multivibrator type that includes transistors 11, 12 and other conventional elements. Coil 10 of electromagnet 1 is employed as the load of the multivibrator, and the electromagnet 1 includes a magnetic yoke 14' and nonmagnetic cover 14. The switch 4 connects the capacitor 2 and the multivibrator. A light emitting diode 15 is connected in parallel to the capacitor 2 to indicate the charge level of the capacitor.

The protective cover 14 is made of nonmagnetic material and is provided on the magnetic yoke 14' for the purpose of preventing direct contact of the head 5 with the magnetic yoke 14', and also protects both the yoke and the head. A pair of terminals 13 connects the capacitor 2 to an external D.C. source (not shown).

FIGS. 5 to 8 show an embodiment of the present invention, wherein the demagnetizing structures are built into a conventional cassette case from which the conventional tape has been omitted. Case 20 has a pair of apertures 21A, 21B through which the drive shafts (not shown) of a conventional cassette tape recorder extend. The case includes an opening 22 through which an erase head (not shown) of the recorder is inserted. Opening 23 is provided through which the recording-reproducing head 5 is inserted. Opening 24 accommodates a conventional pinch roller of the recorder. A printed circuit board 26 mounts the driving circuit 3, switch 4, terminals 13 and light emitting diode 15. The capacitor 2 is mounted within the case 20, as shown. The electromagnet 1 is held in the case 20 at a position adjacent to the opening 23 by a spring member 25, so as to engage the magnetic head 5 which is inserted through that opening. The spring member 25 has an extension 19 which operates the switch 4 to turn it on or off accordance with the movement of the electromagnet 1. The case 20 also has an aperture 27 (FIG. 7) adjacent to the pair of terminals 13 to provide access to these terminals. A window 28 is also included adjacent to the light emitting diode 15 for visualization of the indication of charge level of capacitor 2. In this embodiment, the electromagnet 1 has a magnetic yoke made of magnetic material such as ferrite, and the protective cover 14 is made of non-magnetic material such as synthetic resin tape.

Figure 5:
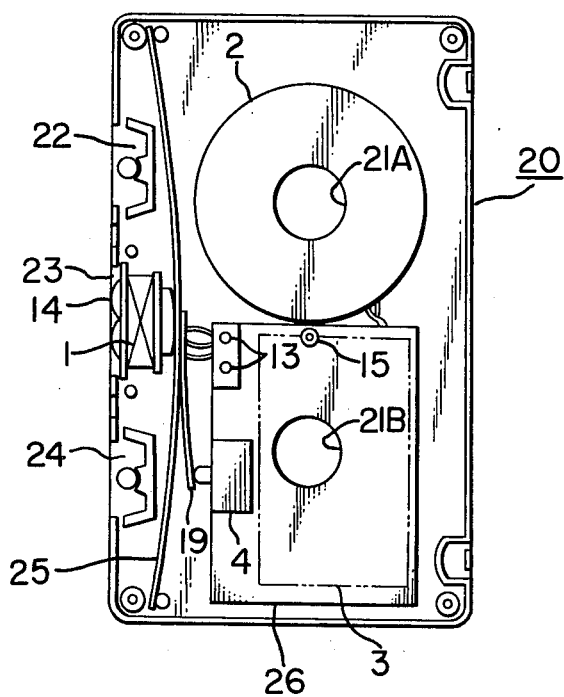
FIG. 5 is a plan view of a demagnetizer assembly embodying this invention in a cassette case, wherein the upper case section has been removed to show the details of the assembly.
Figure 6:
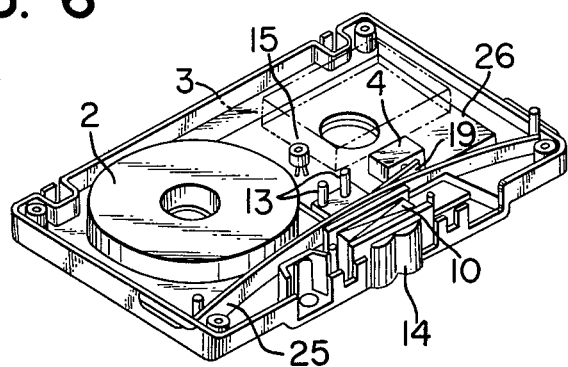
FIGS. 6 and 7 are perspective views of the demagnetizer assembly of FIG. 5.
Figure 7:
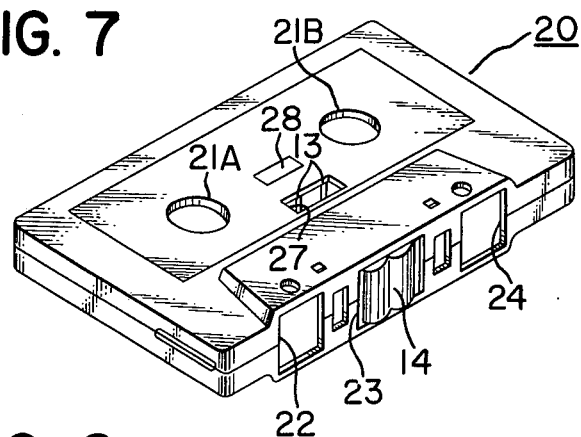
Figure 8:
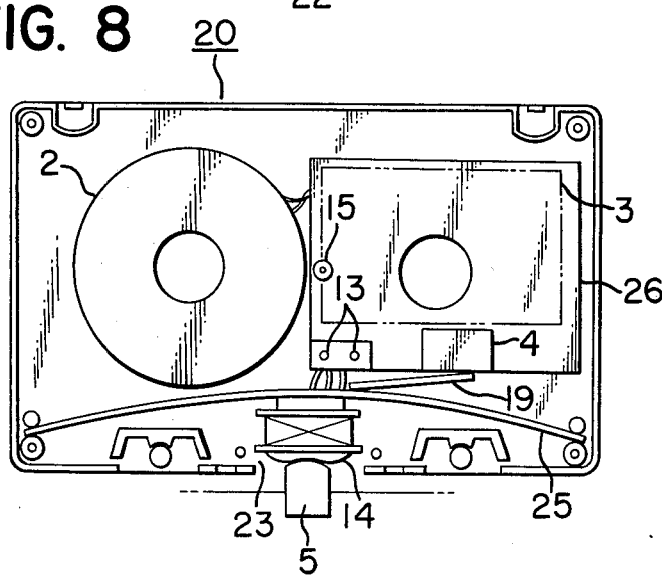
FIG. 8 is a plan view of the demagnetizer of FIG. 5, showing the insertion of a recording-reproducing head of a cassette tape recorder.

FIG. 8 shows the demagnetizer of FIGS. 5–7 when magnetic head 5 is undergoing demagnetization. In FIG. 8, elements of the cassette tape recorder are not shown except the recording-reproducing head 5.

This demagnetizer is typically used as follows.

First, the terminals 13 are connected to an external D.C. power supply to charge the capacitor 2. When the capacitor is sufficiently charged, the light emitting diode will radiate light through the window 28, indicating readiness of the circuit to demagnetize a magnetic head. After the external D.C. power source is removed, the demagnetizer is set into a cassette tape recorder, and the recorder is set in recording or playing (reproducing) condition so that the recording-reproducing head 5 is inserted into the opening 23. Concomitant to that insertion, the head 5 pushes the protective cover 14 and interfits with the electromagnet 1. As the electromagnet 1 is pushed inwardly by the head, it moves against the spring member 25 and causes the switch 4 to be actuated by the extension 19. When the switch is turned on, current from the charged capacitor is supplied to the driving circuit 3, and the electromagnet 1 is energized thereby to produce a high frequency (e.g., 630 Hz) alternating magnetic field sufficiently strong to demagnetize the head. As the capacitor discharges, the strength of the alternating magnetic field also decreases, as shown in FIG. 3, so that the head 5 will be completely demagnetized. When the frequency of the driving current is set about 630 Hz, e.g., it only takes about 0.2 second to completely demagnetize a conventional head. It is preferable to set the frequency above about 100 Hz for demagnetization of conventional heads.

Figure 9:
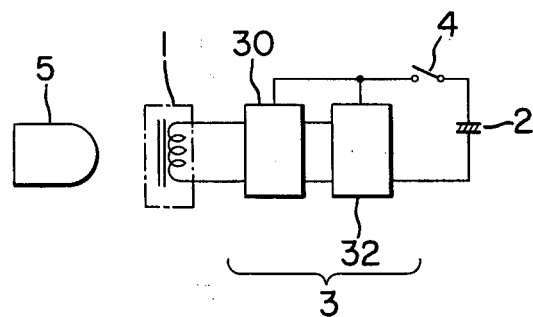
FIGS. 9, 10 and 11 are block diagrams of other forms of demagnetizer assemblies useful in the present invention.
Figure 10:
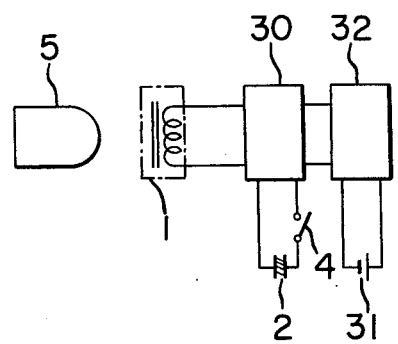

FIG. 9 shows another form of circuit useful in the present invention, wherein the driving circuit 3 includes a power amplification stage 30 inserted between oscillator stage 32 and electromagnet 1. FIG. 10 shows another form of circuit useful in the present invention, wherein the oscillator stage 32 is connected to a battery 31 which is provided in the demagnetizer, and the power amplification circuit 30 is connected to the capacitor 2. In this case, the output of the oscillator stage 32 is constant, and the amplification of the amplifier stage 30 varies in accordance with discharge current from the capacitor 2 so as to produce an alternating magnetic field which gradually decreases.

Figure 11:
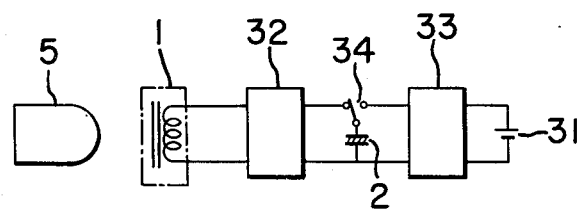

FIG. 11 shows another form of circuit useful in the present invention, wherein battery 31 and D.C.-D.C. converter 33 are provided in the demagnetizer to boost the voltage of the battery in charging the capacitor 2.

In the circuits shown in FIGS. 10 and 11, an external D.C. power source is not required, since battery 31 is included as part of the demagnetizer.

Obviously, many modifications and variations of the disclosed embodiments are possible in the light of these teachings. It is therefore to be understood that the invention is to be defined by the appended claims.

We claim:

1. A demagnetizer for demagnetizing the magnetic head of a conventional cassette-type recording-reproducing device, comprising a case formed in the shape of a conventional tape cassette, said case having an opening for the insertion therein of said magnetic head, an electromagnet positioned in said case adjacent to said opening for applying a magnetic field to said magnetic head, a driving circuit for energizing said electromagnet to produce said magnetic field so that said field gradually decreases in intensity, and biasing means for resiliently urging said electromagnet against said magnetic head within said cassette opening so that said electromagnet and magnetic head are maintained in stationary position with respect to each other during a demagnetizing operation.

2. A demagnetizer according to claim 1, wherein said biasing means comprises a spring member mounted within said case.

3. A demagnetizer according to claim 2, wherein said driving circuit is positioned within said case and includes a switch for controlling the energization of said circuit, and said spring member includes means for actuating said switch.

* * * * *